Nov. 4, 1924.
W. D. BREWSTER
1,513,888
CAR BRAKE OPERATING MECHANISM
Filed Nov. 10, 1923
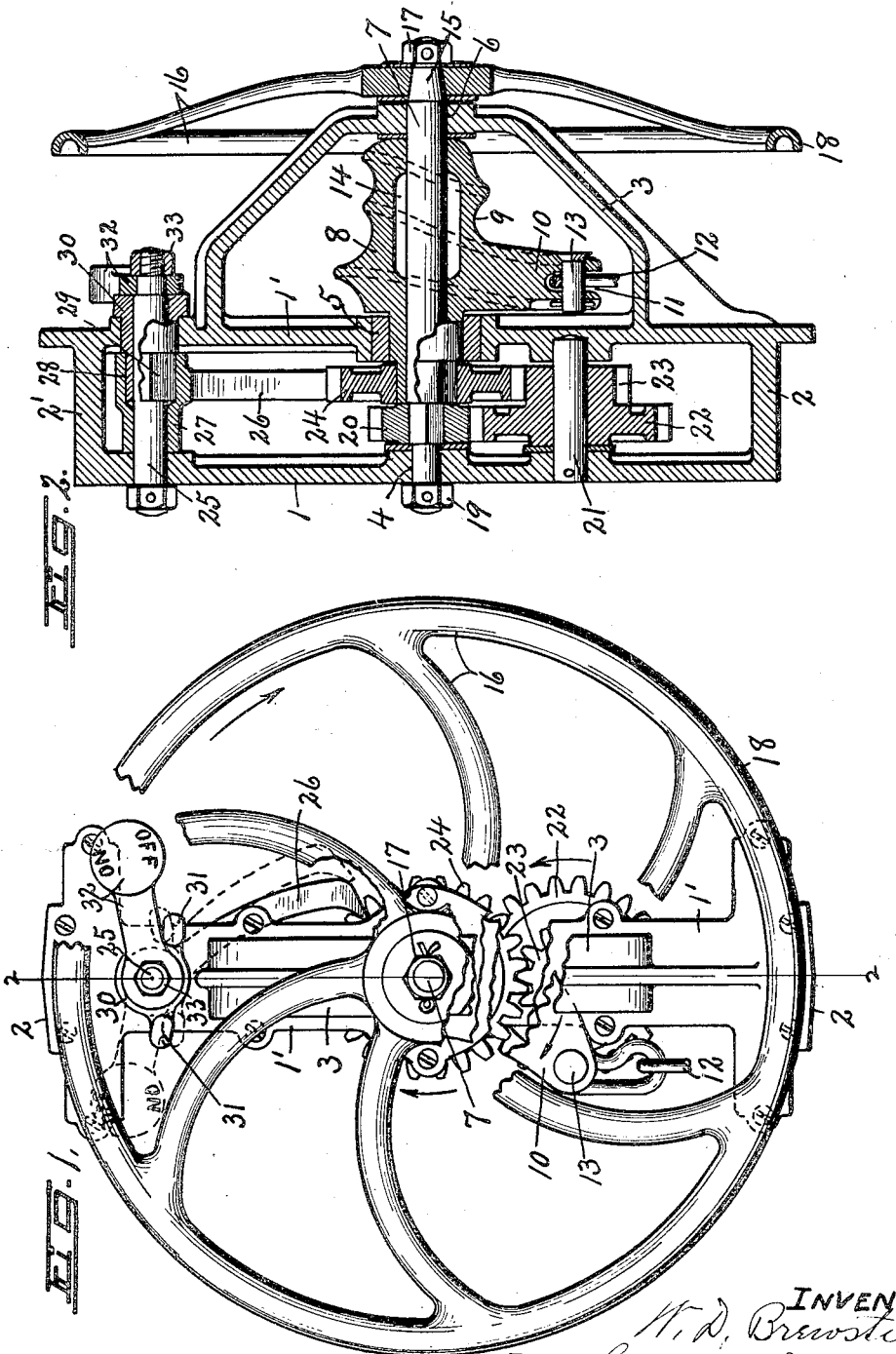
INVENTOR
W. D. Brewster
BY Howard P. Denison
ATTORNEY Patented Nov. 4, 1924.

1,513,888

UNITED STATES PATENT OFFICE.

WILLIAM D. BREWSTER, OF SYRACUSE, NEW YORK, ASSIGNOR TO NATIONAL BRAKE COMPANY, INC., OF BUFFALO, NEW YORK, A CORPORATION OF NEW YORK.

CAR-BRAKE-OPERATING MECHANISM.

Application filed November 10, 1923. Serial No. 673,999.

*To all whom it may concern:*

Be it known that I, WILLIAM D. BREWSTER, a citizen of the United States of America, of Syracuse, in the county of Onondaga, in the State of New York, have invented new and useful Improvements in Car-Brake-Operating Mechanism, of which the following, taken in connection with the accompanying drawings, is a full, clear and exact description.

This invention relates to a car brake operating mechanism and refers more particularly to the disposition of the various parts in compact relation and in such manner that practically the entire load and strains of applying the brake will be concentric in and around the operating shaft.

The main object therefore, is to provide a device of this character which may be installed in a relatively small space upon the car and at the same time to utilize the operating shaft as a part of the supporting means for the conical drum to which the brake operating chain is attached.

Other objects and uses relating to specific parts of the device will be brought out in the following description.

In the drawings:—

Figure 1 is an end view partly broken away, of a brake operating mechanism embodying the various features of my invention.

Figure 2 is a longitudinal vertical sectional view taken on line 2—2, Figure 1.

This device is adapted to be placed in an upright position upon the end of a car with its operating shaft in a substantially horizontal position and comprises a main supporting frame which, in this instance consists of parallel upright bars —1— and —1'— connected and held in spaced relation by lower and upper end posts —2— and —2'—, the outer upright bar —1'— being provided with an outwardly arched brace bar —3—, all of said bars being preferably made as an integral unit of cast metal or other suitable material.

The central portions of the bars —1—, —1'—, and —3— are provided with horizontally alined coaxial bearings —4—, —5— and —6—, the end bars —4— and —6— being adapted to receive and support a brake operating shaft —7—, while the intermediate bearing —5— serves to receive and partially support a conical brake drum —8— which is also loosely mounted upon the shaft —7— coaxial therewith to permit relative rotary movement of the shaft and drum.

The main body of the drum —8— which is interposed between the bearings —5— and —6— is relatively larger than the portion which extends through the bearing —5— and is made frusto-conical and arranged with its larger end adjacent the bearing —5—, said drum being provided with a spiral peripheral groove —9—.

The larger end of the drum —8— is provided with a radially extending arm —10— having a slot —11— extending inwardly from the outer end thereof for receiving one end of a brake operating chain or cable —12— which is detachably connected to said arm —10— by a bolt —13— and is adapted to be wound in the spiral groove of the drum as the latter is rotated in the direction required for applying the brake whereby the initial rotary movement of said drum will cause a rapid take up of the slack of the chain —12— following which the chain will be gradually wound upon the reduced portions of the cone of said drum in order to increase the power of application of the brake.

The enlarged portion of the drum is provided with an internal oil chamber or reservoir —14— for receiving and retaining oil for lubricating the bearings between the shaft and drum.

The outer end of the shaft —7— extends in the bearing —6— and is tapered at —15— for receiving and supporting a hand wheel —16— which is secured to the tapered portion —15— by means of a nut —17— on the adjacent outer threaded end of the shaft, said hand wheel —16— being concentric with the shaft and of relatively large diameter to serve as the means for rotating the shaft at will and is preferably concavo-convex in cross section with its concave side facing the frame and its peripheral rim —18— disposed within the plane of its hub so as to surround the adjacent end of the brace bar —3— and thereby bring the wheel into more compact relation to the frame for economy of space and convenience of manipulation.

The other end of the shaft is also reduced and extended beyond the bearing —4— for receiving a nut —19— which cooperates with the adjacent bearing —4— to hold the shaft against endwise displacement in one direction while the hub of the hand wheel —16— cooperates with the bearing —6— to hold the shaft against endwise movement in the other direction.

A portion of the shaft —7— between the bars —1— and —1'— and preferably adjacent the inner face of the bar —1— is angular or square in cross section and upon this square portion is keyed a tight spur pinion —20—.

A stationary shaft or stud —21— is secured in suitable bearings on the bars —1— and —1'— to extend across the intervening space between said bars at one side and parallel with the shaft —7— for receiving and supporting a spur gear —22— and a pinion —23— which is preferably formed integral therewith or secured thereto so that both may rotate in unison upon the stud —21—.

The gear —22— is relatively larger than the meshes with the pinion —20— on the angular portion of the shaft —7—, while the pinion —23— meshes with a relatively larger spur gear —24— which is secured to a reduced portion of the hub of the drum —8— between the bearing —5— and pinion —20— thereby establishing a driving connection between the shaft —7— and drum —8— as the shaft —7— is rotated by the hand wheel —16— in applying the brakes or reversing the operation when the brakes are released.

The ratio of the gears for transmitting rotary motion from the shaft —7— to the drum —8— is such as to greatly increase the power applied to the brake as compared with that applied to the hand wheel while the winding of the cable or chain —12— around the portion of the drum —8— also serves to increase the power of application of the brakes.

Furthermore, by mounting the drum —8— directly upon the intermediate portion of the shaft —7— and also mounting the gears —20— and —24— upon the shaft —7— and hub of the drum —8— respectively, brings all of those parts into coaxial compact relation, and thereby concentrates the major strains or loads in and around the same axis and enables each part to stiffen the others against radial vibrations which greatly increases the sturdiness and efficiency of the brake mechanism as a whole in addition to the advantage that the entire device may be used upon the ends of cars where other devices would be impracticable.

Suitable means is provided for holding the brake operating mechanism in position for setting the brakes, said means consisting in this instance, of a rock shaft —25— journaled in suitable bearings in the upper ends of the opposite bars —1— and —1'— of the main supporting frame for receiving and supporting a pawl or detent —26— which is movable into and out of engagement with the teeth of the gear —24—.

The pawl —26— is provided with a hub —27— for receiving the shaft —25—, one end of said hub being provided with a socket —28— of angular or square cross section for receiving a similarly formed end —29— of a sleeve —30— which is journaled in the adjacent bearing of the bar —1'— coaxial with the rock shaft —25— so as to allow said rock shaft to turn freely therein.

The outer end of the sleeve —30— is enlarged to abut against the adjacent face of the bar —1'— and is provided with stop shoulders —31— at opposite sides of its axis.

A weighted arm —32— is pivoted upon a reduced portion of the outer end of the rock shaft —25— to swing to opposite sides of the vertical plane of its axis as shown by full lines and also by dotted lines in Figure 1, and is held in operative position by a nut —33— on the adjacent end of the rock shaft.

The stop shoulders —31— are located in the path of movement of the rock arm —32— so that when the weighted arm is rocked to one side of the axis of the shaft —25— it will engage the adjacent stop shoulder —31— and thereby rock the sleeve —30— to force the free end of the pawl into engagement with the teeth of the gear —24—.

On the other hand, by reversing the movement of the weighted arm —32— it will engage the other stop shoulder —31— and thereby rock the sleeve —30— in a corresponding direction to release the pawl from engagement with said gear, the weighted end of the arm being provided with indicia such as "On" and "Off" to indicate the position of the pawl.

I claim:

1. In a brake-operating device, a frame having opposite end journal bearings and an intermediate journal bearing coaxial with the end bearings, a rotary shaft extended through the intermediate bearing and journaled in the end bearings, means for rotating the shaft, a rotary drum journaled in the intermediate bearing coaxial with the shaft, means for transmitting rotary motion from the shaft to the drum, and a brake-operating cable attached to the drum.

2. In a brake-operating device, a frame having opposite end journal bearings and an intermediate journal bearing coaxial with the end bearings, a rotary shaft extended through the intermediate bearing and journaled in the end bearings, means for rotating the shaft, a rotary drum journaled in the intermediate bearing coaxial with the shaft, gearing in the space between one of the end bearings and the intermediate bearing for transmitting rotary motion from the shaft to the drum, said drum having the major portion thereof disposed between the intermediate bearing and the other end bearing, and a brake-operating cable connected to said drum.

In witness whereof I have hereunto set my hand this 3rd day of November, 1923.

WILLIAM D. BREWSTER.

Witnesses:
H. E. CHASE,
RITA CAMPOLIETO.